UNITED STATES PATENT OFFICE.

BERTRAND S. SUMMERS, OF PORT HURON, MICHIGAN.

ART OF RETTING FLAX.

1,238,359.   Specification of Letters Patent.   Patented Aug. 28, 1917.

No Drawing.   Application filed August 25, 1913.   Serial No. 786,482.

*To all whom it may concern:*

Be it known that I, BERTRAND S. SUMMERS, a citizen of the United States, residing at Port Huron, county of St. Clair, and State of Michigan, have invented certain new and useful Improvements in the Art of Retting Flax, of which the following is a specification.

My invention relates more particularly to what may be termed an artificial process of retting, by which the results commonly effected in natural retting are obtained. As is known the natural retting is brought about by exposing the flax to the effects of water in natural streams or ponds, or by spreading it on the field and exposing it to the weather.

In retting by the natural method referred to above, a species of fermentation takes place. This fermentation affects the gummy or pectose matter so as to render the separation of the fiber from the woody tissue comparatively easy. It is also probable that side by side with the fermentation process hydrolysis occurs. The resulting product from these effects is a soft, lustrous fiber for the production of linens, twines and threads, irrespective of the precise nature of the reactions by which it is brought about.

Various methods of artificial retting have been proposed heretofore, and some of them actually resorted to with indifferent success. Among these methods the use of an alkaline solution is most common. Alkaline retting liquors possess certain objectionable features which have been discovered in connection with such processes, and this is particularly true where the alkaline liquor is of considerable strength. The use of such an alkaline liquor renders the woody tissues pliable and difficult to remove, detracts from the strength of the fiber, and seriously affects the spinning quality of the same.

Likewise mineral acids have been tried, with poor results, as the fiber must possess certain qualities which are obtained from the wax-like ingredients of the plant which appear to be more or less eliminated by mineral acids. Strong treatments of this kind failed to give the quality to the fiber that the natural process does.

I have discovered that certain organic acids possess the property of retting the flax, at the same time rendering the woody tissues brittle. In fact, a solution containing organic acids may be prepared so that the flax may be treated with them at high temperatures such as may be obtained in a closed vessel under pressure.

I have discovered that if the raw flax is treated with an alkali in the proper proportion, an organic acid is obtained from the flax, which will produce substantially the same results as natural retting. While I may use several of the well known alkalis, such as carbonate of soda or potash, or the hydrate of soda or potash, I prefer to use the sulfid of an alkali, for the reason that this particular reagent gives a fiber of much better quality. I have discovered that if about two pounds of this alkali is used with 100 pounds of flax, and sufficient water to entirely submerge the flax under treatment, and the same heated preferably to boiling, the alkaline reaction soon disappears and acids result. In fact this acid or acids are so quickly formed that this preliminary operation can be combined with the retting operation proper, that is, the same flax used for preparing the acid can be retted in the acid although the results obtained are not as good as when flax is treated with a solution previously prepared as above.

I have also discovered that it is very desirable to carry on this operation under pressure, and prefer to cook the flax under a pressure of about 50 pounds per square inch, although this pressure may be varied to a very considerable degree. The pressure greatly shortens the length of time required to bring about the results.

After the solution is thus formed it may be used over and over again, although in each case I prefer to add a quantity of sulfid equivalent to about 2 per cent. of the weight of the flax, though this proportion may be varied somewhat, according to the condition of the flax. I usually prefer to use the flax in the broken form, or after the straw has been passed through a brake of some kind, for example corrugated rolls. Where the flax straw has been threshed, a somewhat less proportion of alkali may be used.

The flax is preferably cooked under 50 pound pressure for 4 hours, when it is suitably washed and may be soured. It is then dried, and the remaining woody tissue removed, when it is ready for spinning.

The resulting fiber will be found very soft, lustrous and strong, and the adhering woody particles very brittle and easily removed.

While I have specifically described a process in which my invention may be carried into effect, it is understood that the detailed disclosure is for the purpose of exemplification only, and that the scope of the invention is to be determined from the following claims in which I have endeavored to distinguish it from the prior art so far as known to me without abandoning or relinquishing any portion or feature thereof.

I claim:

1. A method of retting flax which consists in treating a batch of raw flax with a dilute solution of alkali, and heating thereby forming an acid solution, then treating another batch of flax with the solution so formed for the purpose of retting the same.

2. A method of retting flax which consists in treating a batch of raw flax with a dilute solution of alkali and heating to form a dilute solution of organic acids, and then treating another batch of flax with the acid solution so formed for the purpose of retting the same.

3. A method of retting flax which consists in hydrolizing a batch of flax in a weakly alkaline solution under heat to form an acid solution, and then treating a second batch of flax with the solution so formed for the purpose of retting the latter.

4. A method of retting flax which consists in heating the same in a dilute solution of a feeble alkali, obtaining thereby a dilute acid solution and then cooking the flax to be retted in said solution in a closed vessel under pressure.

5. A method of retting flax which consists in forming a dilute solution of organic acids by treating flax with a dilute solution of an alkali and then cooking the flax to be retted in said solution under pressure.

6. A method of retting bast fibers which consists in forming an acid solution by treating the same with a dilute solution of a weak alkali and then cooking said fibers in said solution.

7. A method of retting bast fibers which consists in forming an acid solution by treating the same with a dilute solution of a weak alkali and then cooking said fibers in said solution at a pressure of about fifty pounds.

8. A method of retting flax which consists in forming an acid solution by treating flax plants with a dilute alkaline solution and then heating the flax to be retted under pressure with such solution.

9. The process of retting flax fiber which consists in treating the flax by boiling it under pressure with water containing two per cent. by weight of the flax of sulfid of an alkali under pressure.

BERTRAND S. SUMMERS.

Witnesses:
D. D. BROWN,
GUSTAV HILL.